United States Patent [19]
Walter

[11] Patent Number: 4,730,648
[45] Date of Patent: Mar. 15, 1988

[54] LOADING PUMP FOR METERING LIQUID TO PASTY PRODUCTS INTO CUPS

[75] Inventor: Kurt Walter, Glauburg, Fed. Rep. of Germany

[73] Assignee: Hassia Verpackungsmaschinen GmbH, Heegweg, Fed. Rep. of Germany

[21] Appl. No.: 939,559

[22] Filed: Dec. 9, 1986

[30] Foreign Application Priority Data

Dec. 10, 1985 [DE] Fed. Rep. of Germany ....... 3543504

[51] Int. Cl.⁴ .............................................. B65B 37/06
[52] U.S. Cl. ..................... 141/91; 141/186; 141/242; 222/309
[58] Field of Search ................................ 141/129–191, 141/250–284, 234–248, 285–310; 222/309

[56] References Cited
U.S. PATENT DOCUMENTS 3,605,645 9/1971 Herrmann .......................... 141/242
3,695,486 10/1972 Warner ............................... 141/242

*Primary Examiner*—Houston S. Bell, Jr.
*Attorney, Agent, or Firm*—Kurt Kelman

[57] ABSTRACT

The dispensing pump is intended for metering pasty products into a group of molding bowls cylically advanced under the dispensing pump. The dispensing pump comprises a plurality of commonly drivable metering piston pumps (2) corresponding in number to the number of bowls disposed in series and in side-by-side relationship, with the pumps being provided with closing and opening elements associated with dispensing nozzles (7). To provide a compact and space-saving configuration with short and rectilinear conveying distances for the feedstock to be metered and thereby to provide favorable cleaning conditions, the dispensing pump is so constructed that the closing and opening elements are disposed in a flat valve block below the metering piston pumps. Feedstock distributor channels for each pump row are provided in the valve block in parallel to rotary slide valves with feedstock carrying channels pivotal by a common drive into the dispensing and metering position. Disposed below the rotary slide valves and the feedstock carrying channels thereof, respectively, is the respective dispensing nozzle in alignment with the respective metering piston pump.

3 Claims, 4 Drawing Figures

LOADING PUMP FOR METERING LIQUID TO PASTY PRODUCTS INTO CUPS

BACKGROUND OF THE INVENTION

1. Field of the Invention

The present invention is concerned with a dispensing pump for metering liquid to pasty products, such as oils, jams, cottage cheese or the like into cups or bowls disposed in series and side-by-side relationship to form groups of bowls in a continuous strip cyclically advanced under the dispensing loading pump.

2. Description of Prior Art

It is well known in the art to fill pasty products, such as cottage cheese, jam, butter or the like into more or less deep-drawn cups formed by deep-drawing corresponding strips of plastic material. Metering, as a rule, is respectively effected in a row of such bowls advanced in the continuous strip whereafter the complete continuous strip emerging from the loading station is sealed by a covering foil, with the sealed and filled-up bowls being singled. Arrangement and construction of a corresponding row of metering piston pumps in the loading station is unproblematic even if two bowls in series arrangement in the loading station are intended to be filled because there is still ample space for accommodating the individual metering piston pumps. However, arrangement of such pumps will become difficult if it is intended to fill up a whole group of bowls composed, for example, of thirty-five cups made up of rows disposed in series arrangement and in side-by-side relationship. This will present special difficulties when the bowls are of relatively small dimensions and are located at small distances from one another. When filling up this type of bowls disposed in groups, the loading station, heretofore, has been so constructed that the metering piston pumps of corresponding sizes yet in fewer numbers have been located above a so-called feedstock distributor and the dispensing nozzle holder including a number of dispensing nozzles corresponding to the number of bowls contained in the group, has been established by a plurality of tubular lines. For this purpose, an opening and closing mechanism will have to be provided both between piston metering pumps and distributor and on the holder for the dispensing nozzles, that are respectively opened and closed in accordance with the dispensing cycle by suitable drives operable in synchronism. Although the operation is satisfactory, it is readily manifest that it envolves substantial mechanical efforts and correspondingly high space requirements as the distances between the supply tank for the feedstock and the dispensing nozzles are relatively extended thereby also hampering thorough cleansing of the loading stations which will have to be done from time to time to keep them sterile. Moreover, at times of standstill, some products are likely to solidify in the connecting lines.

SUMMARY OF THE INVENTION

In the practice of the invention, the dispensing pump is so constructed that the elements for closing and opening the supply of feedstock are combined in a flat valve block disposed beneath the metering piston pumps wherein feedstock distributor channels are disposed for each pump row, namely in parallel to rotary slide valves rotatable in the dispensing and metering position by a common drive and corresponding to the number of pump rows and provided with stock feeding channels, with the respective dispensing nozzle being disposed underneath such rotary slide valves on the valve block in alignment with the respective metering piston pump.

Accordingly, it is essential that associated with each dispensing nozzle is a metering piston pump, which dispensing pumps are disposed in the same raster as the bowls therebelow of a group of bowls in the loading station. Disposed between each metering piston pump and the associated dispensing nozzle is a closing and opening valve; however, these valves for a row of metering piston pumps are accommodated in a rotary slide valve embracing the whole row and located directly between the outlets of the metering piston pumps and the dispensing nozzles. Separate feedstock supply is not provided for each metering pump but, instead, a plurality of feedstock distributor channels are at the same time disposed in the valve block provided with a corresponding number of rotary slides, from which channels the individual metering pumps draw in the mass to be metered in a corresponding position of the rotary slides and then, after re-switching the rotary slides, meter the feedstock through the dispensing nozzles into the bowls. Advantageously, the individual metering piston pumps are not mounted on the valve block as separate units but are combined in a cylinder block which in corresponding alignment with its ports is seated on the valve block. A feedstock distributor channel is disposed respectively between two rotary slide valves in the valve block, with transverse channels emerging therefrom leading to the feedstock carrying channels in the neighboring rotary slide valves. With five or six rotary slide valves, for example, provided in the valve block, advantageously, only three feedstock distributor channels are needed. This will be described in closer detail hereinafter.

OBJECTS OF THE INVENTION

It is, therefore, one object of the present invention to provide an apparatus for filling up groups of closely spaced bowls arranged in a continuous strip, wherein the distances between the metering pumps are equally arranged in a group, and the dispensing nozzles are as short as possible, with the rotary slide valves being actuable by a drive.

According to another object of the invention, the cylinders of the metering pumps are provided in a compact unit mountable as a whole on the valve block.

A further object of the invention resides in providing as few feedstock supply channels and feedstock distributor channels in the valve block relative to the rotary slide valves as possible.

Still another object of the invention is to so construct the dispensing pump that it can be easily washed and cleaned with no need for dissembly.

Other objects, davantages and novel features of this invention will become manifest from the following detailed description in conjunction with the accompanying drawings.

DESCRIPTION OF THE PREFERRED EMBODIMENT

Figure 1:
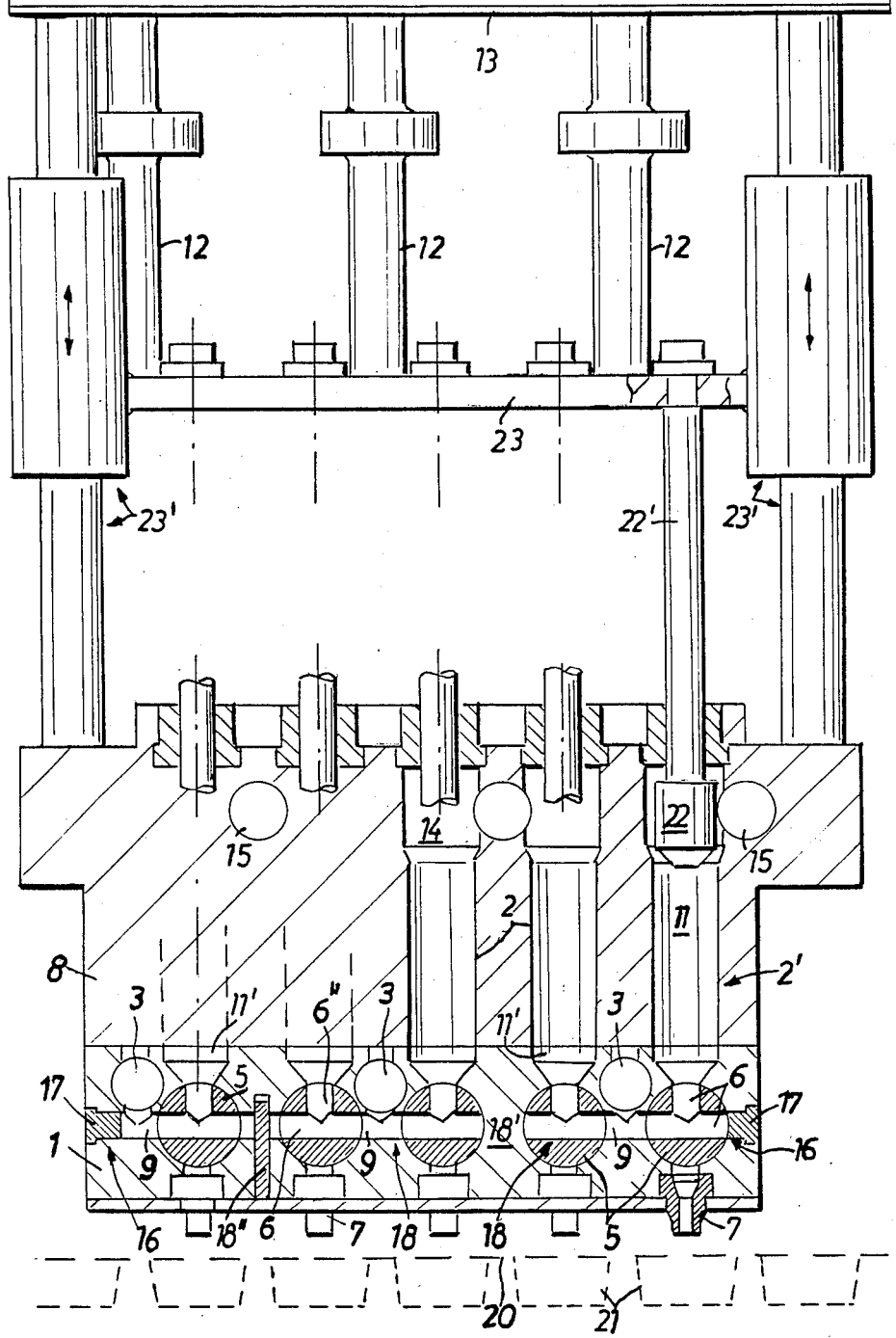
FIG. 1 is a sectional view of the dispensing pump in the passage direction of the packing strip to be loaded.

As shown in FIG. 1, the dispensing pump comprises a plurality of commonly drivable metering piston pumps 2 disposed in series and in side-by-side relationship and corresponding in number to the number of bowls 21 arranged in a group of bowls, with dispensing nozzles 7 being respectively associated with the metering piston pump 2. In the embodiment as shown, the dispensing pump is intended for a group of bowls comprising thirty-five bowls 21 (see FIG. 4). The closing and opening mechanism is arranged in the form of a flat valve block 1 underneath the metering piston pumps 2, advantageously together with a cylinder block 8 disposed on the valve block 1, with the pump cylinders 11 being in alignment with corresponding ports 11' in the valve block 1 and with the crossings being sealed accordingly. Disposed in valve block 1 are feedstock distributor channels 3 for at least one pump row 2', with the feedstock distributor channels 3 leading to commonly drivable rotary slide valves 5 having feedstock carrying channels 6, pivotable by a common drive 4 (FIG. 3) into the dispensing and proportioning position and corresponding in number to the number of the pump rows 2', with the respective loading nozzle 7 also suitably sealed being disposed underneath the rotary slide valves 5 on the valve block in alignment with the respective metering piston pump 2. The feedstock carrying channels 6 provided in the rotary slide valves 5 comprise a through port centrally connected to loading port 6'' at one side thereof, of which only one is designated by numeral 6'' in FIG. 1. As shown in FIG. 1, advantageously, two rotary slide valves 5 are fed by one feedstock distributor channel 3 for which purpose transverse channels 9 are provided in valve block 1, forming sections of ports 18 in the valve block 1 sealed at the ends thereof by closures 17. As, in the illustrated embodiment, a total of five rotary slide valves 5 are provided, the lefthand feedstock distributor channel 3 only feeds the one rotary slide valve 5 provided therein, whereas the other four rotary slide valves 5 are fed respectively in pairs by the feedstock distributor channels 3 located therebetween. Disposed in each rotary slide valve 5 are seven such feedstock carrying channels 6 in series arrangement equally oriented in the illustrated embodiment.

The rotary slide valves 5, for the dispensing operation of the pump cylinders 11, are so adjusted that the loading ports 6'' are in alignment with the transverse ports 9, i.e. the loading ports 6'' to be fed in pairs are directed against one another so that during retraction of the pistons 22—which is effected by means of a lift beam 23 (FIG. 2) seizing all piston rods—the feedstock is sucked from the distributor channels 3 into the cylinders 11. Once the cylinders 11 are filled with the stock to be metered, the rotary slide valves 5 are correspondingly swung which is effected by way of drive 4 as shown in FIG. 3, with the through ports 6' of the feedstock carrying channels 6 establishing the direct connection between the cylinders 11 and the dispensing nozzles 7. Then the dispensing channels 6' are not in communication with the transverse channels 9 but are rather, due to the neighboring walls of the cylinder block 1, in the closing position as the sections of the ports 18 are separated from one another through the valve block material (at 18') or through the blocking members 18 as shown, for example, by FIG. 1. After completion of the metering operation, the rotary slide valves 5 are correspondingly reset for the next dispensing operation for the cylinders 11.

Figure 2:
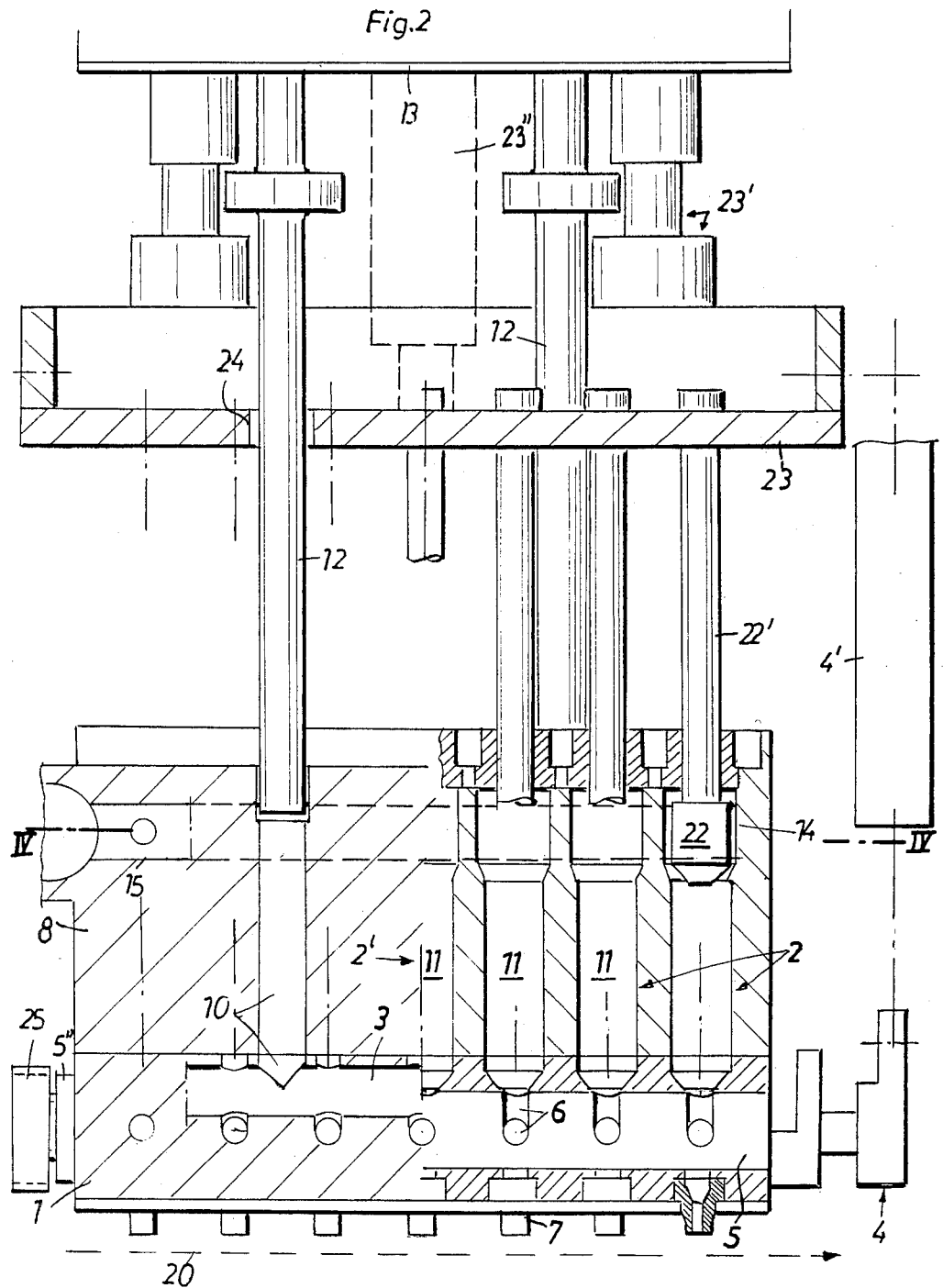
FIG. 2 shows a section through the dispensing pump transverse of the passage direction of the packing strip.
Figure 3:
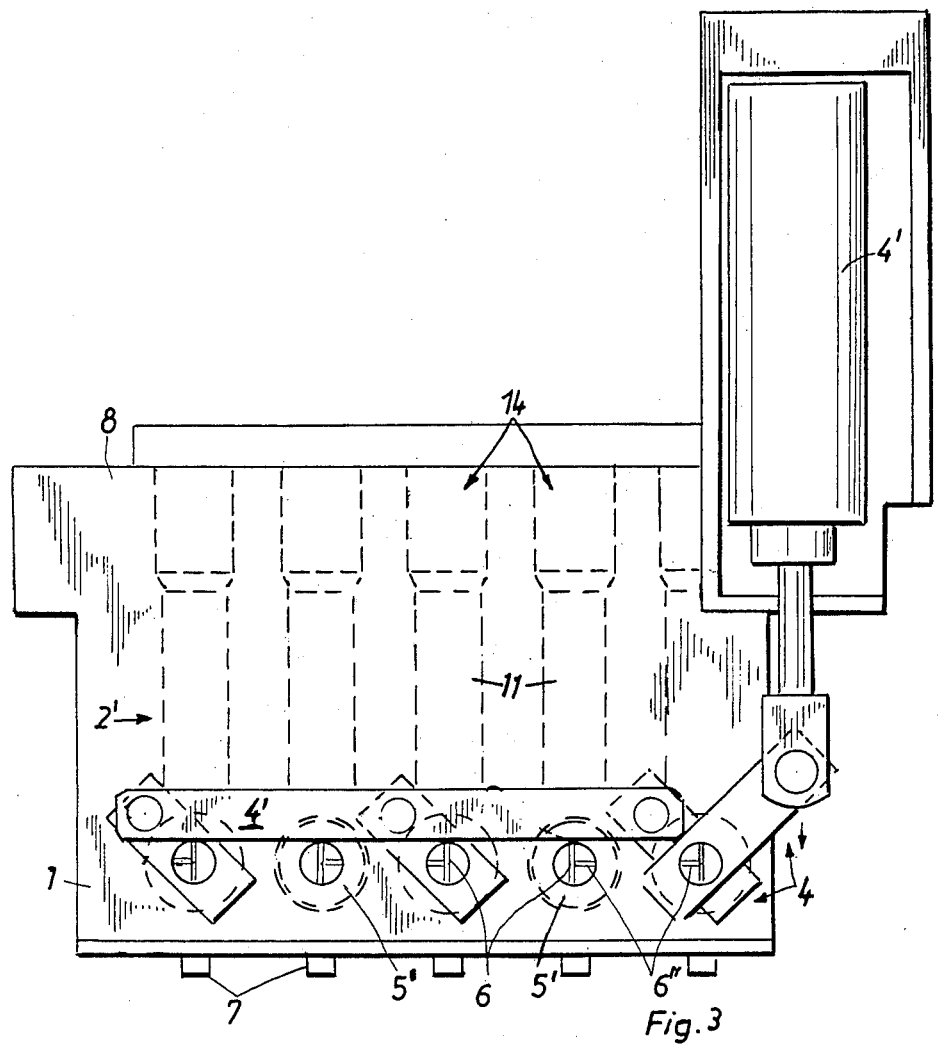
FIG. 3 is a side view of the dispensing pump.

As shown in FIGS. 1 and 2, the reservoir 13 is disposed above the cylinder block 8 of the feedstock reservoir 13 at an adequate distance in order not to hamper the movability of the driving beam 23, from which reservoir (see FIGS. 2 and 4) feedstock supply channels are fed downwardly to the distributor channels 3, with the supply channels, in part, being formed as ports 10 provided in the valve and cylinder blocks 1 and 8 extending in parallel to the pump cylinders, and, in part, being formed above the cylinder block 8 by conduits 12 extending in alignment with ports 10. For this purpose, the driving beam 23 is provided with corresponding passage apertures 24.

The drive 4 for the rotary slide valves 5, according to FIG. 3, comprises a crank assembly reciprocated by a pneumatic control cylinder 4', with the rotary slides 5', in the illustrated embodiment not connected to control cylinder 4', being moved in the opposite direction by means located, for example, at the other side of the valve block 1. Such means, suitably are small toothed gears 25 provided at the rotary slide valve ends 5'' of the rotary slide valves 5', that mesh with corresponding toothed gears (not shown) provided at the rotary slide valves 5. The driving beam 23 for the piston rod 22' guided on a parallel guide 23' according to FIG. 1 equally is moved up and down in the dispensing and metering cycle by a corresponding control cylinder 23'' (shown in broken lines in FIG. 2).

Figure 4:
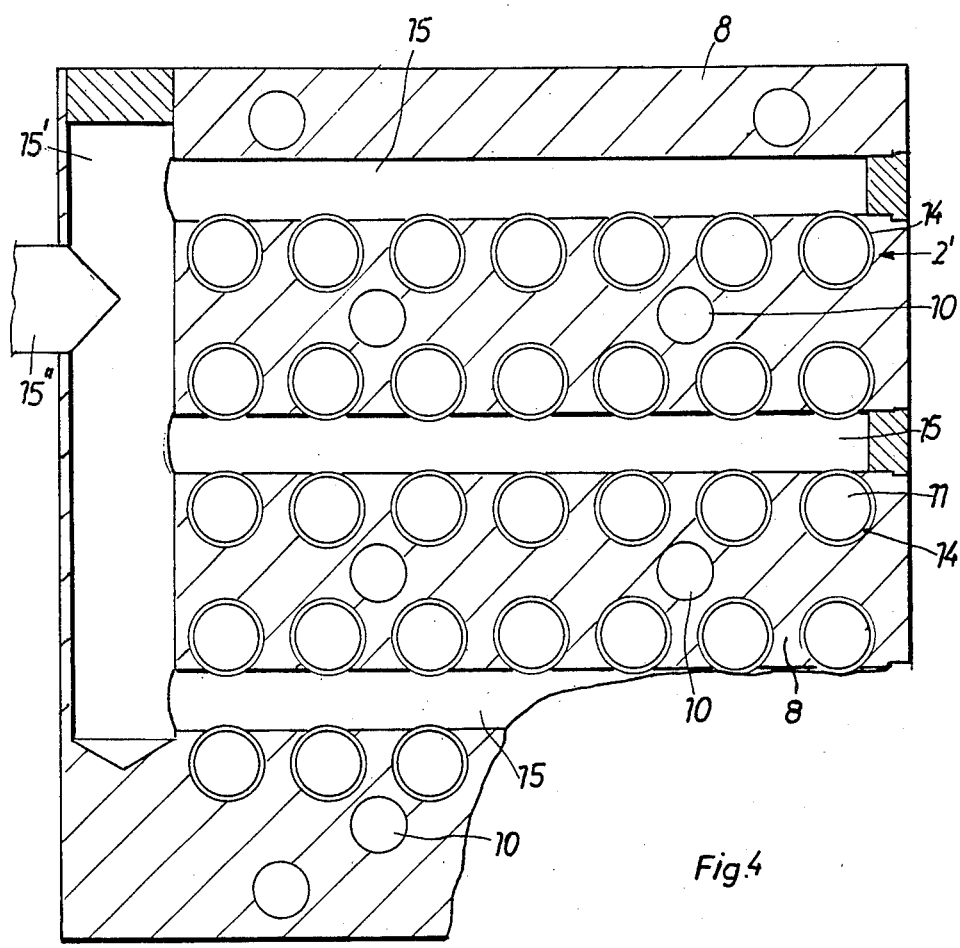
FIG. 4 is a sectional view along the line IV—IV in FIG. 2.

As conveyed by FIGS. 1, 2 and 4, cylinders 11, in the upper area thereof, are provided with scavenging expansions 14 into which the pistons can be retracted if the complete unit is to be washed. For this purpose, washing channels 15 are provided in the cylinder block 8, extending parallel to the feedstock distributor channels 3, with the washing channels intersecting the expansions 14, as especially shown in FIG. 4. Here, too, respectively two cylinder rows 2' are embraced by one washing channel 15, provided that an even-numbered number of pump rows 2'' is provided. In an odd-numbered number of pump rows 2', as provided in the illustrated embodiment, a washing channel 15 (see FIG. 4, top) embraces only one pump row 2'. Washing channels 15 lead to a common cleansing agent distributor channel 15' disposed with a cleaning connection 15'' at a suitable place of the cylinder block 8. Washing is, hence, effected from the areas of the cylinder 11 forming the washing expansions 14, with the passage ports 6' of the rotary slide valves 5 being in the opening position, i.e. in alignment between cylinders 11 and the dispensing nozzles 7 unless the rotary slide valves 5 are completely removed for the cleaning operation, which is, of course, readily possible.

It will thus be seen that the objects set forth above, and those made apparent from the preceding description, are efficiently attained but some changes may be made in the above construction without departing from the spirit and scope of the invention; it is intended that all matter contained in the above description or shown in the accompanying drawings shall be interpreted as illustrative and not in a limiting sense.

It is also to be understood that the following claims are intended to cover all of the generic and specific features of the invention herein described, and define the scope of the invention.

What I claim is:

1. A dispensing pump for metering a liquid-to-pasty product into bowls cyclically advanced in a continuous strip defining a group of said bowls arrayed in at least one row, which comprises
- (a) a cylinder block comprising a corresponding group of metering piston pumps having a number of said metering piston pumps corresponding to the number of said bowls and arrayed in a respective row in alignment with the row of bowls,
- (b) a common drive means for the metering piston pumps,
- (c) a flat valve block arranged below the cylinder block and comprising a corresponding group of rotary slide valves, a respective one of the slide valves being associated with, and arranged below, a respective one of the metering piston pumps,
  - (1) each rotary slide valve defining a product carrying channel consisting of a through bore and a loading bore connected centrally thereto and extending perpendicularly therefrom, and
  - (2) the flat valve block defining respective distributor channels for the product between respective pairs of the rotary slide valves, the product distributor channels extending parallel to the axes of the rotary slide valves, and a respective transverse channel leading from each product distributor channel to the slide valve product carrying channel,
- (d) a common drive means for the rotary slide valves arranged to pivot the rotary slide valves of each of said pairs about the axes thereof between a first position wherein the through bores thereof are in communication with the transverse channels and a second position wherein the loading bores face each other and are in communication with the transverse channels,
- (e) a respective dispensing nozzle associated with each one of the rotary slide valves and in alignment therewith and with the associated metering piston pump, each dispensing nozzle being in communication with the associated metering piston pump through the through bore when the associated rotary slide valve is in the second position,
- (f) at least one product supply channel passing through the cylinder and valve blocks parallel to the metering piston pumps, the product supply channel being connected to the product distributor channels for supplying the product thereto,
- (g) a product reservoir arranged above the cylinder block, and
- (h) a conduit means connecting the product supply channel to the reservoir.

2. The dispensing pump of claim 1, wherein the transverse channels leading from each product distributor channel to the slide valve product carrying channels of the rotary slide valves are defined by aligned channel sections of a transverse through channel defined in the valve block, the transverse through channel and each channel section having sealed opposite ends.

3. The dispensing pump of claim 1, wherein each metering piston pump comprises a cylinder having an expanded top section, and the cylinder block defines channels communicating with the expanded cylinder top sections and extending parallel to the product distributor channels for supplying a cleansing agent to the cylinders through the expanded cylinder top sections.

* * * * *